J. CAVANAGH.
APPARATUS FOR SUPPORTING VEHICLE AXLES.
APPLICATION FILED MAR. 25, 1916.
1,364,248.
Patented Jan. 4, 1921.
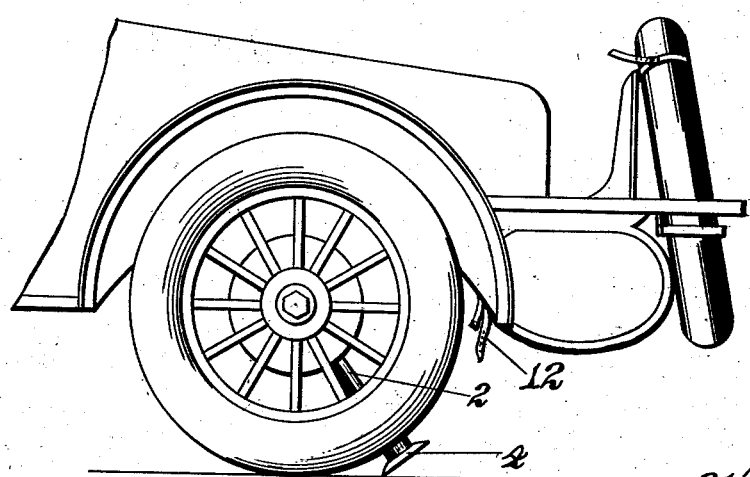
Fig.1.
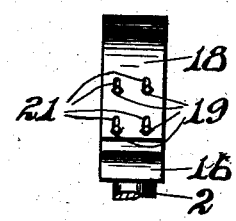
Fig.5.
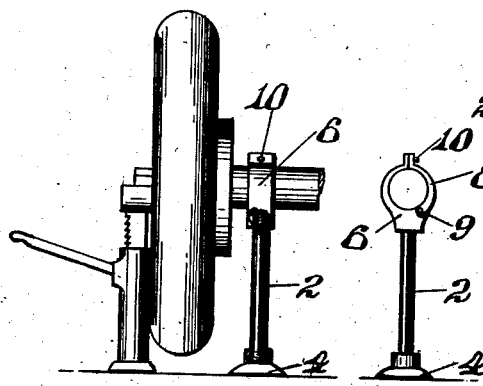 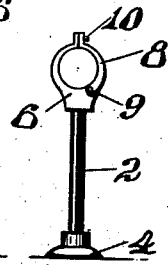 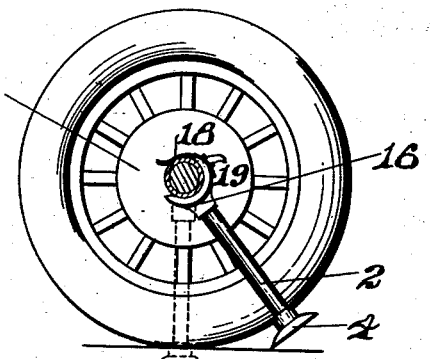
Fig.2.   Fig.3.   Fig.4.
INVENTOR
James Cavanagh

UNITED STATES PATENT OFFICE.

JAMES CAVANAGH, OF BOSTON, MASSACHUSETTS.

APPARATUS FOR SUPPORTING VEHICLE-AXLES.

1,364,248.  Specification of Letters Patent.  Patented Jan. 4, 1921.

Application filed March 25, 1916. Serial No. 86,673.

*To all whom it may concern:*

Be it known that I, JAMES CAVANAGH, a citizen of the United States, residing at Boston, in the county of Suffolk and State of Massachusetts, have invented certain Improvements in Apparatus for Supporting Vehicle-Axles, of which the following description, in connection with the accompanying drawings, is a specification, like reference characters on the drawings indicating like parts in the several figures.

This invention relates to apparatus for use in supporting the axle of a vehicle with the wheel off the ground so that the wheel or the tire of the wheel may be changed or repaired. Many motor vehicles of modern types have their gasolene tanks supported at the rear of the rear axle, making it difficult to introduce a lifting jack into position for lifting the axle without actually getting under the car and after the jack is so located it is only with extreme difficulty and inconvenience that the jack lever can be operated to raise the car. It is also the custom to provide a baggage carrier at the rear of the car and behind the tank and this carrier, particularly when occupied by baggage, makes it still more difficult to get at the rear axle. Tires are often carried at the rear of the tank or at the rear of the baggage carrier when a baggage carrier is used and this still further increases the difficulty of getting the jack in under the rear axle. In fact it has been the experience of automobilists that much more time is consumed in getting a lifting jack under the rear axle and operating it to lift a wheel from the ground than is consumed in making a change of wheels or tires after the wheel is lifted. Moreover it is extremely annoying and inconvenient for the driver when dressed for the road to get down under the rearwardly projecting portions of the machine and position the jack under the axle and to operate it when in this position.

It is the object of this invention to provide apparatus for rendering the jacking of automobiles or similar vehicles easy and convenient, particularly those vehicles which have comparatively inaccessible rear axles. With this object in view embodiments of the invention will be described by way of illustration, it being understood that various modifications may be made without departing from the spirit of the invention.

In the drawings,

Figure 1 shows the rear portion of a motor vehicle equipped with an apparatus embodying this invention;

Fig. 2 is a rear view of a wheel and a portion of the axle of the vehicle with the apparatus in operative position and showing also a lifting jack;

Fig. 3 is a view of one embodiment of the invention;

Fig. 4 is a view taken inside a wheel of a vehicle looking outwardly showing the axle and axle housing in section and one embodiment of the invention applied to the axle in the position it assumes prior to the lifting of the wheel; and Fig. 5 is a detail of the construction shown in Fig. 4.

Referring to the drawing, 2 represents a strut or standard having preferably a flange or foot piece 4 at its lower end. Coupling means 6 is provided at the opposite end of the strut for securing it rotatably to the axle or axle housing of the vehicle. The length of the strut including the foot piece and the portion of the coupling means below the axle is somewhat greater than the radius of the wheel of the vehicle upon which the apparatus is to be used, and preferably means is provided for adjusting the length of the strut to adapt it for use on vehicles having different sized wheels. This may conveniently be done, as shown in Fig. 2, by providing threaded connections between the strut 2 and the foot piece 4 or between the strut 2 and the attaching or coupling means 6 or both. As shown in Figs. 2 and 3, the means for attaching the strut to the axle housing is a relatively permanent fastening comprising a two-part sleeve 6, 8 secured to the strut and adapted to be placed in position to embrace the housing by separation of the parts 6, 8 about a pivot 9. A clamping screw 10 is provided to hold together the parts of the sleeve on the housing. The hole in the sleeve formed by the parts 6, 8 is sufficiently large to permit free movement of the sleeve upon the housing. The strut is held off the ground when not in use by a strap 12, Fig. 1, or other securing means, for example, a latch. In case the apparatus is thus permanently secured at one end of the axle it is preferably duplicated at the other end of the axle so that one is always ready when required for holding the adjacent wheel off the ground. The front axle may also be equipped, if desired, in the same manner.

In Fig. 4 a form of the apparatus is shown which may be carried on the machine or in the tool box and applied to either end of the axle only when required. In this form of the apparatus the coupling means has the form of a hook or clasp with an opening wide enough to receive the housing. As shown, the coupling member comprises a member 16 and a member 18 secured to the member 16 and shaped to provide an opening 20 between the member 16 and the end of the member 18. The member 18 may be in the form of a spring secured to the member 16, in which case the opening 20 between the member 16 and the end of the spring 18 may be slightly less than the diameter of the housing, the spring being adapted to yield to permit the entrance of the housing into the opening 20 so that the parts will be relatively positioned for the support of the housing on the member 16 at the lower side of the opening when the strut assumes a vertical position beneath the axle. This construction provides a convenient means for temporarily securing one end of the strut to the housing, the spring 18 preventing accidental displacement of the strut while it is being brought into operative position. The spring 18 is secured to the member 16 by screws 19, slots 21, Fig. 5, being provided in the spring to permit adjustment of the spring on the member 16 to vary the size of the opening 20 and thereby adapt the apparatus for use on axles of different sizes.

In the use of the apparatus, in case the machine is equipped with the form shown in Figs. 2 and 3, the strap or latch 12 which holds the strut in inoperative position is released and the strut allowed to rest on the ground in an oblique position as shown in Fig. 1. A jack of any usual construction may then be placed under the hub or hub cap on the outside of the wheel where there is plenty of room to operate it and where any length of lever may be employed for operating the jack. When the axle is raised by operation of the jack the strut swings by gravity into a vertical position beneath the axle and when the axle is lowered it will support the axle with the wheel off the ground so that the wheel or the tire may be changed with convenience. After the change or repair has been effected the machine may be run forward a short distance to release the strut or the axle may again be raised by application of the jack to the wheel. When released the strut may be again secured in inoperative position.

When the readily detachable form of the apparatus shown in Fig. 4 is employed only one such apparatus is necessary, and when required for use the apparatus is taken from the machine or tool box and the driver, by taking hold of the strut or the flange at the end of the strut, may easily engage the hooked formation at the upper end of the strut with the axle housing. The length of the strut together with the length of the driver's arm permits this operation to be performed conveniently even when the parts of the vehicle or attachments thereto extend several feet beyond the rear axle and close to the ground. When thus positioned the apparatus operates in the same way as has been described for the form of the invention which is more permanently secured to the axle. After use this form of the invention may be readily detached and placed aboard the vehicle until the next occasion for use arises. In Fig. 4 the dotted lines indicate the operative position of the apparatus and show the distance the wheel must be raised to permit the apparatus to swing into operative position.

The apparatus embodying my invention may also be used with advantage when a machine is in the garage or when it is being stored for a period of time, it being very desirable that a vehicle having pneumatic tires should be supported with the tires off the ground when not in use as the life of the tires is thereby greatly prolonged.

Having described my invention, what I claim as new and desire to secure by Letters Patent of the United States is:

An apparatus for use in jacking one end of an axle of a vehicle having laterally spaced wheels comprising a standard of sufficient length to support one end of the axle with the adjacent wheel off the ground when in a vertical position beneath the axle, and a resilient hook on the end of the standard adapted to yield to permit entrance of the axle into the hook whereby the standard will be suspended from the axle when the axle is raised and will support the axle when it is lowered, the said hook being constructed and arranged for adjustment to adapt it to axles of different sizes.

In testimony whereof I have signed my name to this specification.

JAMES CAVANAGH.